United States Patent [19]

Keenan et al.

[11] Patent Number: 4,523,655

[45] Date of Patent: Jun. 18, 1985

[54] VEHICLE FRAME TRANSMISSION MOUNTING ASSEMBLY

[75] Inventors: Thomas F. Keenan; John J. Kass, both of Dubuque, Iowa

[73] Assignee: Deere & Company, Moline, Ill.

[21] Appl. No.: 444,922

[22] Filed: Nov. 26, 1982

[51] Int. Cl.³ .............................................. B60K 17/00
[52] U.S. Cl. .................................... 180/9.1; 180/294; 180/70.1; 74/606 R; 74/665 T
[58] Field of Search ................. 180/9.1, 6.2, 6.7, 292, 180/293, 294, 295, 298, 70.1; 74/606 R, 655 T

[56] References Cited

U.S. PATENT DOCUMENTS

| | | | |
|---|---|---|---|
| 3,310,698 | 3/1967 | Krell | 74/606 X |
| 3,872,939 | 3/1975 | Eckert | 74/606 X |
| 3,966,061 | 6/1976 | Fehn et al. | 180/294 X |
| 4,276,952 | 7/1981 | Kuhfuss | 180/294 |

Primary Examiner—John A. Pekar

[57] ABSTRACT

A vehicle frame comprising a forward section adapted to contain an engine and a rear section adapted to contain a steering drive mechanism ahead of and in communication with a transmission, the rear section is formed by a forward wall, top and bottom walls, and opposing sidewalls, and a detachably mounted rear cover to define a housing. The transmission is supported by and slidable along mounting rods, the mounting rods being fixably mounted forwardly in the housing in a cantilevered fashion. The transmission is further mounted detachably to rearwardly located mounting wall within the housing. The transmission communicates with a forwardly located steering drive mechanism in the housing.

16 Claims, 5 Drawing Figures

VEHICLE FRAME TRANSMISSION MOUNTING ASSEMBLY

BACKGROUND OF THE INVENTION

This invention relates to mounting arrangements for mounting a component on a vehicle and more particularly to the mounting of a transmission in an off-road vehicle frame.

Off-road vehicles locoated at a remote job site may require transmission servicing. Because of the generally modular construction of the transmissions, servicing will often require removal of the transmission from the vehicle. Although the transmission package may be readily detached from the vehicle frame, drive shaft, and axles, it has proven difficult to remove the transmission from the vehicle due in part to interference with adjacent components of the vehicle.

To improve the transmission serviceability characteristic, it is known to mount the transmission rearward on a vehicle frame as illustrated in U.S. Pat. Nos. 2,971,398, 3,871,462, and 4,276,952. The illustrated mounting arrangements can exhibit alignment difficulties, especially when a hydraulic power shift transmission is employed.

SUMMARY OF THE INVENTION

It is an objective of the present invention to present a vehicle frame transmission mounting arrangement providing improved serviceability characteristics. It is a further objective of the present invention to present a mounting arrangement particularly suited for employment with a power shift transmission.

The vehicle main frame has a forward and rear section. The rearward section is comprised of a housing having a detachable rearwardmost wall. The housing further contains a plurality of transversely aligned sections separated by interior walls wherein the second or middle section houses a transmission. The transmission is supported forwardly on a plurality of cantilever mounted longitudinal extending rods and is rearwardly detachably mounted to a plurality of mounting walls. The transmission can be detached from the mounting wall and slidably removed from the rear housing along the mounting rods.

A particularly suited hydraulic transmission herein referred to as a low profile transmission includes an output shaft extending forward from the transmission parallel to a forwardly received input shaft. The output shaft communicates with a bevel drive system mounted forward on the transmission casing. Steering shafts extend into the bevel drive, one end of each steering shaft respectively communicates with a steering clutch assembly and final drive. The transmission includes a plurality of hydraulic fluid receiving ports. The mounting wall contains a manifold having a plurality of hydraulic fluid ports. A plurality of tubular members communicate a respective one of the ports in the manifold to a port in the transmission wall.

Other objectives and benefits of the present invention will be developed in the Detailed Description of the Preferred Embodiment.

DETAILED DESCRIPTION OF THE PREFERRED EMBODIMENT

Figure 1:
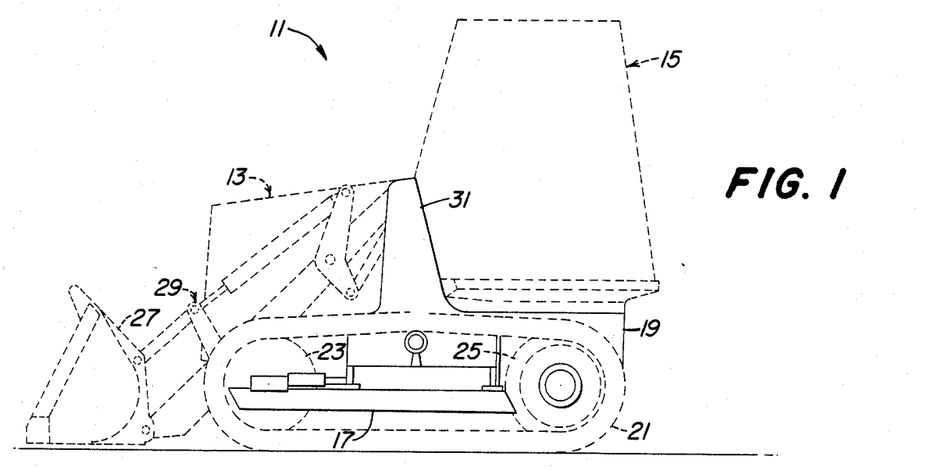
FIG. 1 is a side elevational view of a crawler-loader partially in phantom.

Referring to FIG. 1, a crawler-loader, generally indicated as 11, has an engine compartment 13 followed by an operator station 15 (shown in phantom) mounted on a frame having a forward section 17 and rear section 19. The vehicle is supported on endless tracks 21 carried by a respective forward idler wheel 23 and a rear drive sprocket 25. The vehicle 11 has a bucket 27 attached to a lift assembly 29 mounted to a tower 31 on the forward frame.

Figure 2:
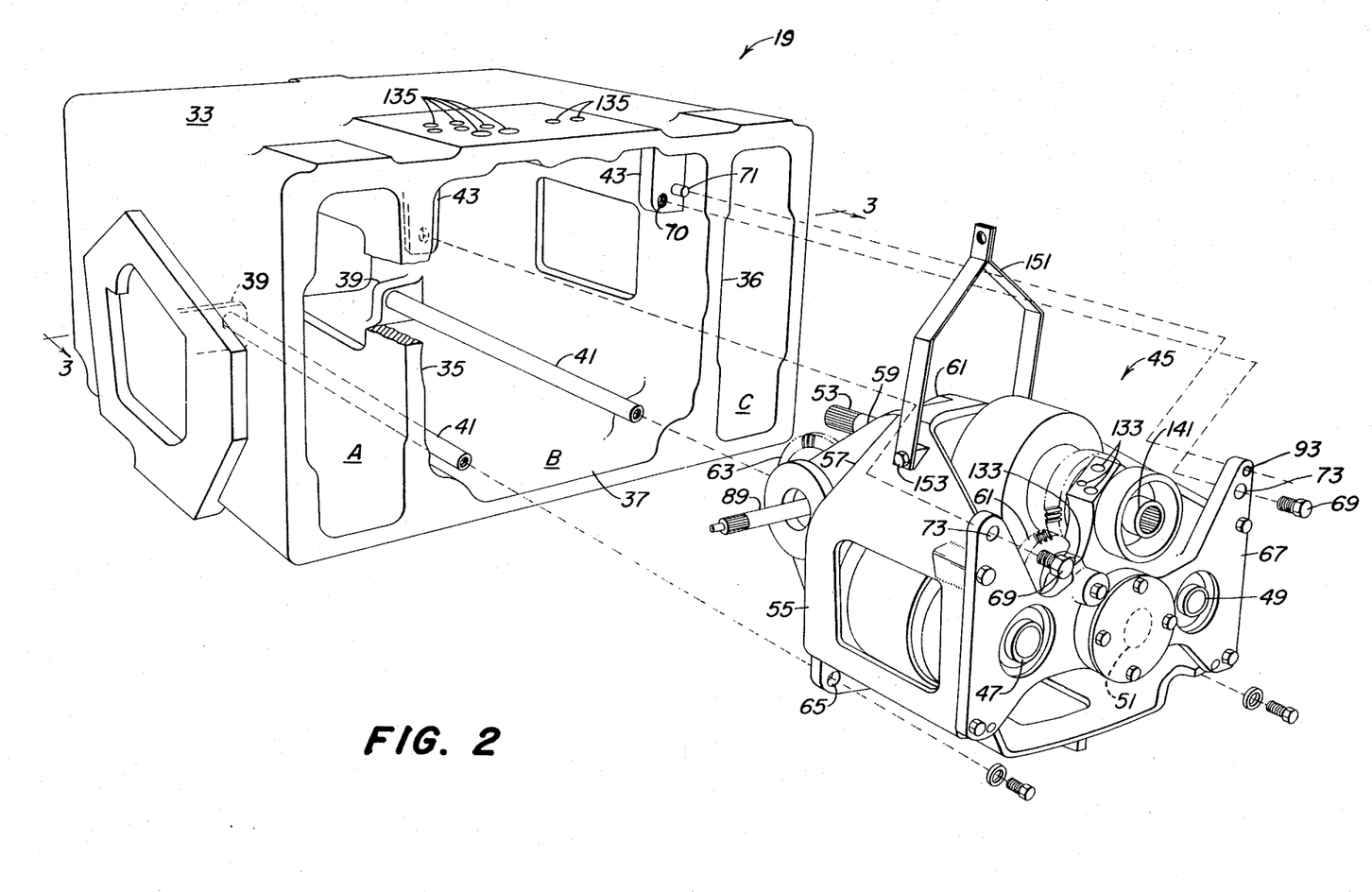
FIG. 2 is an exploded view of the rear frame section and accompanying transmission.

Referring to FIG. 2, the rear frame portion 19 is comprised of a housing 33 having an open rear face. A first and second interior wall 35 and 36, respectively, are formed in housing 33 in spaced apart alignment to divide the interior of housing 33 into transversely aligned sections A, B, and C. Formed generally forwardly in the middle section B to the bottom wall 37 of the housing 33 are first and second mounting members 39. Guide rods 41 are fixably mounted by any conventional means to a respective mounting member 39 to extend rearwardly in a cantilevered manner. Rearwardly located in section B is a plurality of formed mounting walls 43.

A transmission, generally indicated as 45, is mounted in the housing section B in a manner subsequently described. The preferred embodiment of transmission 45 is characterized by its generally low profile. To achieve a low profile, transmission 45 includes a plurality of shafts 47, 49, and 51 aligned parallel, and coplanar along the horizontal, the output shaft 51 being placed between gear shafts 47 and 49. An input shaft 53 is aligned generally directly above and extends parallel with the output shaft 51. The shafts 47, 49, 51 and 53 are rotatably mounted in a transmission frame or casing 55 between casing wall 57 and 67 by any conventional means.

The transmission casing's forward wall 57 has a pair of outwardly extending formed mounting arms 59 and 61. The arms 59 and 61 have transversely aligned holes for mounting of a ring gear assembly 63 to be described subsequently.

The forward wall 57 of the transmission casing 55 has a bottom portion extending downwardly containing a plurality of spaced apart apertures 65 therein (only one shown). A rear wall 67 of the casing 55 has a vertical upwardly extending portion containing a plurality of spaced apart apertures 73. The transmission 45 is slidably mounted on guide rails 41 which extend through respective apertures 65. The vertically extending portion of casing wall 67 is detachably mounted by any conventional means to mounting walls 43 such as by bolts 69 received in threaded hole 70. For the purpose of alignment, one of the mounting walls 43 has a formed outwardly extending guide pin 71 whicnh is matingly received by a guide aperture 93 in the rear wall 67 of the transmission. To further assure proper alignment, guide rods 41 have an increasing tapered diameter to assure a mating fit in apertures 65 when the guide pin 71 is fully received in aperture 93.

Figure 3:
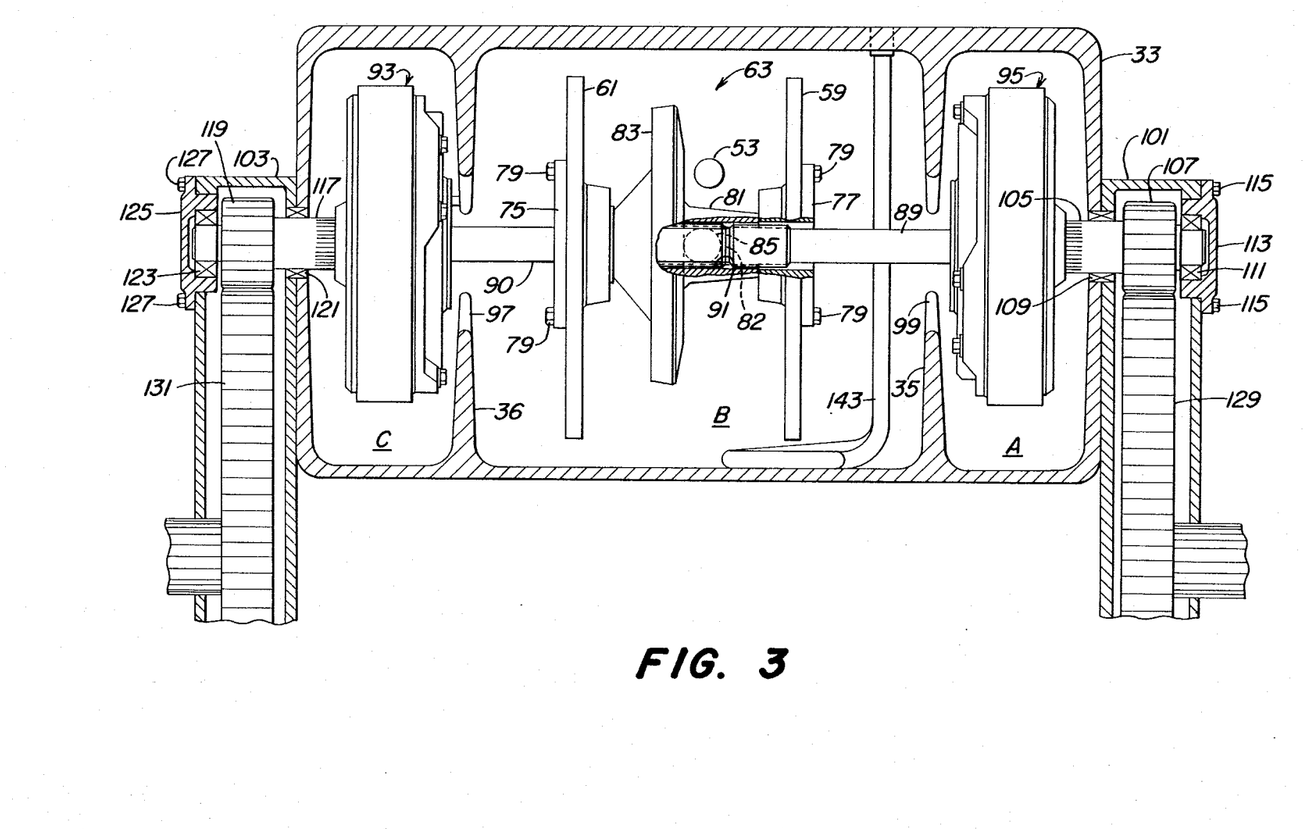
FIG. 3 is a partial sectional end view of the transmission within the rear housing of the vehicle frame along line 3—3.

Referring more particularly to FIG. 3, the ring gear assembly 63 includes first and second quills 75 and 77, respectively, fixably mounted in the hole of respective mounting arms 61 and 59 by any conventional means, such as by bolts 79. A ring gear hub 81 carrying a ring gear 83 is rotatably suspended between quills 75 and 77 in a conventional manner on respective bearings within the quills 75 and 77. The bevel pinion 85 is in constant mesh with the ring gear 83 and is fixably mounted to the output shaft 51 of transmission 45 by any conventional means. Steering shafts 89 and 90 extend into the hub 81 from a respective side to assume an end abutting colinear alignment at 82. Each shaft 89 and 90 is in splined engagement with hub 81 at 91. The other end of the steering shaft 90 is received by a first conventional brake-clutch 93 in a conventional manner located in housing section C. The other end of the steering shaft 89 is received by a second conventional brake-clutch 95 in a conventional manner located in housing section A. The respective end portions of steering shafts 89 and 90 extend through openings 99 and 97 in respective walls 35 and 36.

Fixably mounted to each side of housing 33 is a final drive gear housing 101 or 103. A shaft 105 in driven communication with clutch-brake 95 in a conventional manner extends from clutch-brake 95 into housing 101. The shaft 105 has fixably mounted thereon a gear 107 located in housing 101. The shaft 105 is rotatably mounted in housing 101 by any conventional means such as by bearings 109 and 121. A quill 113 housing bearing 111 is detachably mounted to the housing 101 by any conventional means such as by bolts 115, such that removal of the quill 113 permits removal of shaft 105 and gear 107.

In like manner to shaft 105, a shaft 117 is in driven communication with clutch-brake 93 in a conventional manner and extends into housing 103. The shaft 117 is rotatably mounted in housing 103 on bearings 121 and 123. A quill 125 housing bearing 123 is detachably mounted to the housing 103 by bolts 127 to permit removal of shaft 117 and gear 119. Gears 107 and 119 are in driving communication with respective final drive gears 129 and 131 rotatably mounted by any conventional means in respective housings 101 and 103 to communicate with the venhicle's drive sprockets 25 in a conventional manner.

Figure 4:
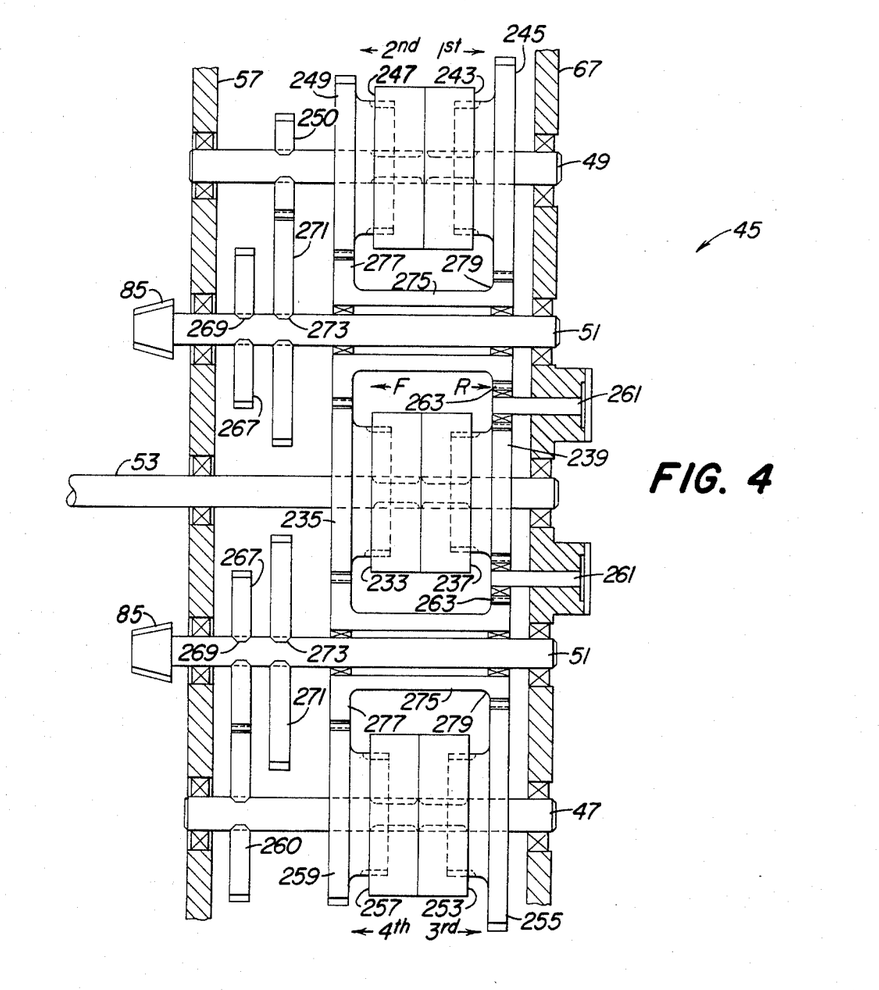
FIG. 4 is a schematic of the transmission with the present invention.

Referring now to FIG. 4, a low profile transmission 45 particularly suited is shown in schematic with some components out of true position for the purpose of clarity. The transmission 45 is a power shift with four forward and four reverse speeds. The input shaft 53 is rotatably mounted by any conventional means to the forward and rearward walls 57 and 67, respectively. A conventional power shift forward clutch assembly 233 is mounted in a conventional manner to shaft 53 clutchable to a gear 235 rotatably mounted on shaft 53 in a conventional manner for coupling gear 235 to the input shaft 53, and a conventional power shift reverse clutch assembly 237 is mounted in a conventional manner to shaft 53 clutchable to a gear 239 to the input shaft 53. The gear shaft 49 includes a first conventional power shift gear clutch assembly 243 mounted to shaft 49 in a conventional manner clutchable to a gear 245 rotatably mounted on shaft 49 to couple gear 245 to shaft 49. In like manner, shaft 49 also contains a second conventional power shift gear clutch assembly 247 clutchable in a conventional manner to a gear 249 to couple gear 249 to shaft 49. A gear 250 is fixably mounted by any conventional means to the first shaft 49. A third conventional gear clutch assembly 253 is mounted in a conventional manner to shaft 47 in a conventional manner to couple gear 255 to shaft 47. In like manner, a fourth conventional gear clutch assembly 257 is mounted to shaft 47 clutchable to a rotatably mounted gear 259 to couple gear 259 to shaft 47. Second gear shaft 47 also contains a gear 260 fixably mounted thereto by any conventional means. Fixably mounted in the housing to the rear wall 67 by any conventional means is an idler shaft 261, shown in two locations for the purpose of clarity. The idler shaft 261 carries a single gear 263 rotatably mounted thereon by any conventional means and in constant mesh with gear 239. The output shaft 51, shown in two locations for clarity, has fixably mounted thereon by any conventional means a first gear 267 at 269 in constant mesh with gear 260. A second gear 271 is fixably mounted by any conventional means to shaft 51 at 273 in constant mesh with gear 250. A double gear 275 is rotatably mounted by any conventional means to the output shaft 51, the double gear 275 including a first gear 277 in constant mesh with gears 249, 235 and 259 and a second gear 279 of double gear 275 including a first gear 277 in constant mesh with gears 245, 255 and 263. The output shaft 51 extends beyond the forward wall 57 of the housing 55 and has a bevel pinion 85 fixably mounted thereto by any conventional means. The following Table I shows the gearing action through the transmission under indication conditions.

TABLE I

| Speed Range | Forward | | | | | |
|---|---|---|---|---|---|---|
| 1st | 235/277 | 277-279 | 279/245 | 245-250 | 250/271 | |
| 2nd | 235/277 | 277/249 | — | 249-250 | 250/271 | |
| 3rd | 235/277 | 277/279 | 279/255 | 255-260 | 260/267 | |
| 4th | 235/277 | 277/259 | — | 259-260 | 260/267 | |
| | Reverse | | | | | |
| 1st | 239/263 | 263/279 | — | 279/245 | 245-250 | 250/271 |
| 2nd | 239/263 | 263/279 | 279-277 | 277/249 | 249/250 | 250/271 |
| 3rd | 239/263 | 263/279 | — | 279/255 | 255/260 | 260/267 |
| 4th | 239/263 | 263/279 | 279-277 | 277/259 | 259/260 | 260/267 |

It is noted that the transmission 45 configuration eliminates the need for countershafts which are generally employed in off-road vehicle transmissions.

Figure 5:
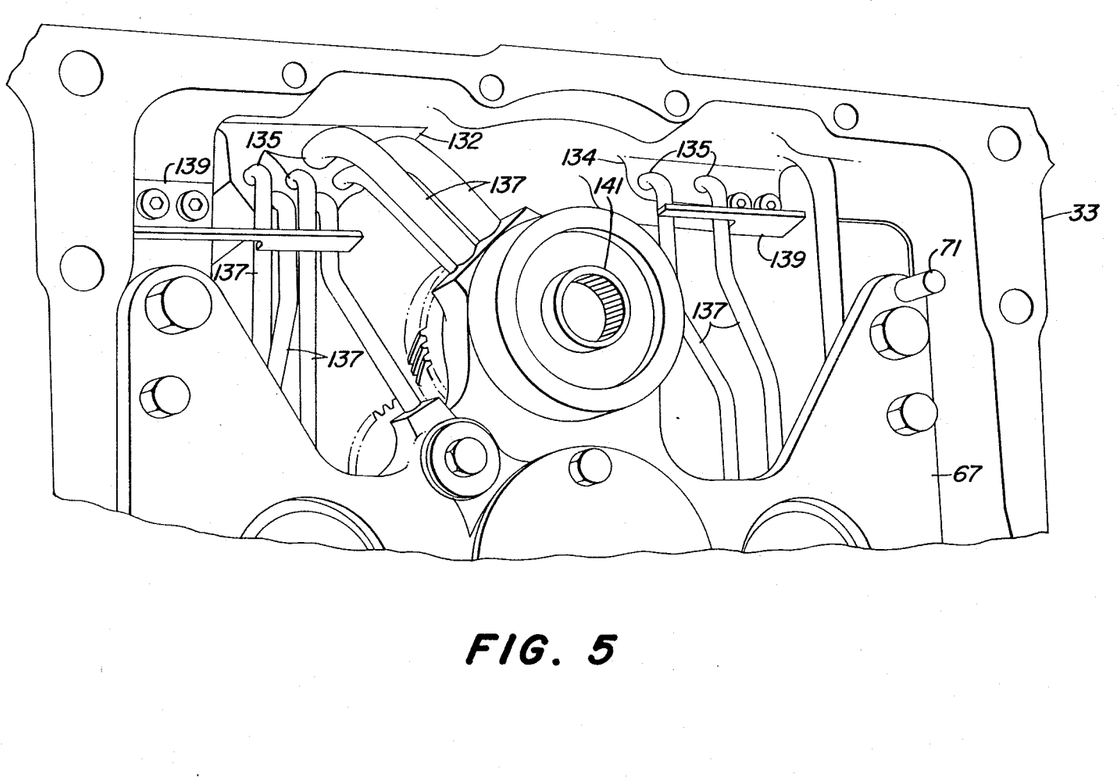
FIG. 5 is a partial end view of the transmission within the rear housing of the vehicle frame.

Referring to FIGS. 2 and 5, the transmission rear wall 67 contains a plurality of ports 133 (some not shown) for delivering hydraulic fluid to the transmission clutches for their selective operation and to the contained shafts for lubrication in a conventional manner. The top wall of housing 33 has a plurality of ports 135 therethrough leading to manifolds 132 and 134. A plurality of conduits 137 have one end received by a respective port 135 in manifolds 132 or 134. The remaining ends of each conduit 137 is received by a respective port 133. A retaining strip 139 is detachably mounted by any conventional means to manifold 134 to restrain motion of conduits 137. In like manner, a second retaining strip 139 is detachably mounted to wall 43 to restrain motion of conduits 137 associated with manifold 132. Any conventional means can be employed for selectively delivering fluid to ports 135.

A conventional power take-off coupler 141 is drivingly mounted to the input shaft 53 and rotatably mounted in wall 67 by any conventional means. Further, section B can function as a sump for vehicle's hydraulic system, whereby a return conduit 143 can retrieve fluid from section B (refer to FIG. 3) when an end wall (not shown) is detachably mounted to housing 33, enclosing section A, B, and C. The end wall will have an opening for access to the coupler 141. It is noted that the transmission casing 55 allows for spillage into housing section B, which may function as a means of returning hydraulic fluid to sump, i.e., section B.

To remove the transmission 45 from housing 33, the rear wall is removed. Quills 113 and 125 are removed to allow shafts 89, 90, 105 and 117 to be withdrawn from the housing 33. The retaining strips 139 can then be removed to allow conduits 137 to be withdrawn from ports 135. By removing bolts 69, the transmission can be slidably withdrawn from the housing along rods 41. To assist in handling the transmission 45, a transmission support mechanism 151 of conventional design can be attached to transmission 45 at 153 (one location not specifically shown).

The aforedescribed is of the preferred embodiment, and should not be viewed as limiting. The full scope of the present invention is defined by the appended claims.

We claim:

1. A vehicle main frame, comprising: a forward section adapted to contain an engine; a rear section adapted to contain a steering drive mechanism ahead of and in communication with a transmission, said rearward section having a forward wall, top and bottom walls, and opposing sidewalls defining a housing; means for mounting said steering drive means and said transmission within said housing such that access is provided to readily decouple said steering drive means from said transmission, such that said transmission can be slidably removed from said housing, comprising;
   (a) a plurality of first mounting members fixably mounted to said bottom wall in close proximity to said forward wall in said housing;
   (b) a plurality of guide rods, each of said guide rods fixably mounted to a respective one of said mounting members to extend rearwardly in a generally cantilevered manner;
   (c) a plurality of second mounting members fixably mounted rearwardly to said top wall in said housing;
   (d) said transmission to include a casing having a forward wall, rear wall, and plurality of sidewalls housing, gear reducing means, an input shaft being rotatably mounted in said forward wall and said rear wall of said transmission; an output shaft coupled to said gear reducing means extending therefrom through said forward wall and rotatably mounted in said forward wall and rear wall of said transmission, said forward wall of said casing having a bottom portion extending below said casing containing a plurality of apertures wherethrough a respective one of said guide rods extends such that said transmission is slidably supported along said rods; said rear wall of said casing having a top portion extending above said casing fixably and detachably mounted to said second mounting members; and
   (e) means for coupling said steering drive mechanism to said output shaft.

2. A vehicle main frame, comprising: a forward section adapted to contain an engine; a rear section adapted to contain a steering drive mechanism ahead of and in communication with a transmission, said rearward section having a forward wall; top and bottom walls, and opposing sidewalls defining a housing; means for mounting said steering drive means and said transmission within said housing such that access is provided to readily decouple said steering drive means from said transmission and said transmission can be slidably removed from said housing, including
   (a) a plurality of first mounting members fixably mounted to said bottom wall in proximity to said forward wall in said housing;
   (b) a plurality of guide rods, each of said guide rods fixably mounted to a respective one of said mounting members to extend rearwardly in a generally cantilevered manner.
   (c) a plurality of second mounting members fixably mounted rearwardly to said bottom wall in said housing;
   (d) said transmission to include a casing having a forward wall, rear wall, and plurality of sidewalls housing gear reducing means, a input shaft being rotatably mounted in said forward wall and said rear wall of said transmission; an output shaft coupled to said gear reducing means extending therefrom through said forward wall and rotatably mounted in said forward wall and rear wall of said transmission, said forward wall of said casing having an upper portion extending above said casing containing a plurality of apertures wherethrough a respective one of said guide rods extends such that said transmission is slidably supported along said rods; said rear wall of said casing having bottom portion extending below said casing fixably and detachably mounted to said second mounting member;
   (e) means for coupling said steering drive mechanism to said output shaft.

3. A vehicle main frame as claimed in claim 1 or 2 wherein said guide rods are tapered to assume a mating fit in said apertures of said forward wall of said casing when said rear wall of said casing is fixably and detachable mounted to said second mounting members.

4. A vehicle main frame as claimed in claim 1 or 2 wherein said second mounting members further comprise a respective guide tab received in an aligning aperture in said rear wall of said casing such that said transmission is properly aligned.

5. A vehicle main frame as claimed in claim 1 or 2 wherein said coupling means comprises,
   (a) a first mounting arm fixably mounted to and extending forwardly of said forward wall of said casing;
   (b) a second mounting arm fixably mounted to and extending forward of said forward wall of said casing, said first and second mounting arms having respectively horizontal holes transversely aligned to said casing;
   (c) a hub extending through and rotatably mounted in said holes of said mounting members, said hub having a splined bore coextensive therein;
   (d) a bevel gear fixably mounted to said hub;
   (e) a mating pinion to said bevel gear fixably mounted to said output shaft in constant mesh with said bevel gear;

(f) a steering drive shaft carrying external splines mating to said splines in said hub bore, said steering shaft being slidably mounted in said hub bore; and (g) steering means for communicating with said steering shaft, said steering means to allow access to said steering drive shaft such that said steering drive shaft can be slidably withdrawn from said hub.

6. A frame for a crawler tractor, comprising: a front section adapted to contain a radiator, an engine; and, a rear section adapted to support an operator's compartment and house a steering drive mechanism forward of a low profile transmission, said rear section including a forward wall; a top and bottom wall, and opposing sidewalls, and a plurality of first mounting members fixably mounted to said bottom wall in close proximity to said forward wall in said housing, a plurality of guide rods, each of said guide rods fixably mounted to a respective one of said mounting members at one end and extending rearwardly, a plurality of second mounting members fixably mounted to said top wall in said housing rearwardly of said first mounting members, said low profile transmission including; a casing having a forward wall, rear wall and a plurality of sidewalls, an input shaft extending through said forward wall into said casing and rotatably mounted in said forward and rear walls, an output shaft extending through said forward wall into said casing and rotatably mounted in said forward and rear walls; gear reducing means for communicating said input shaft to said output shaft, said gear reducing means being contained in said casing, said gear reducing means to have a low profiled configuration characterized by a generally horizontal and coplanar extension with at least one of said shafts, said forward wall of said transmission casing having a lower portion extending below said casing, said lowwer portion of said forward wall having a plurality of apertures therein through which a respective one of said rods extend, said forward wall being slidably mounted on said rods, said rear wall of said transmission casing having an upper portion extending above said casing, said upper portion of said rear wall being fixably and detachably mounted to said second mounting members; and steering drive means detachably coupled to said transmission.

7. A frame as claimed in claim 6 wherein said steering drive means comprises:
 (a) a first mounting arm fixably mounted to and extending forward of said forward wall of said casing;
 (b) a second mounting arm fixably mounted to and extending forwardly of said forward wall of said casing, said first and second mounting arms having respective horizontal holes transversely aligned to said casing;
 (c) a hub extending through and rotatably mounted in said holes of said mounting arms, said hub having a longitudinally extending splined bore therein;
 (d) a bevel gear fixedly mounted to said hub oriented generally vertical and perpendicular to said output shaft;
 (e) a mating gear to said bevel gear fixably mounted to said output shaft in constant mesh with said bevel gear;
 (f) steering drive shafts carrying external mating splines to said splines in said hub, said steering drive shafts being slidably in said hub bore and extending beyond said hub;

(g) means for driving and selectively steering said tractor, including first and second clutching means communicating with respective ends of said steering drive shafts.

8. A frame for a crawler tractor, comprising: a front section adapted to contain a radiator, an engine, and a rear section adapted to support an operator's compartment and contains a steering drive mechanism forward of a low profile power shift transmission, said rear section including a forward wall, a top and bottom walls, and opposing sidewalls, a plurality of first mounting members fixably mounted to said bottom wall in close proximity to said forward wall in said housing, a plurality of guide rods, each of said guide rods fixably mounted to a respective one of said mounting members, a plurality of second mounting members fixably mounted to said top wall in said housing rearwardly of said first mounting members, at least one of said second mounting members having a guide pin extending rearwardly, said low profile transmission including a casing having a forward wall, rear wall and a plurality of sidewalls, an input shaft extending through said forward wall into said casing and rotatably mounted in said forward and rear wall, an output shaft extending through said forward wall into said casing and rotatably mounted in said forward and rearwalls, gear reducing means for communicating said input shaft to said output shaft, said gear reducing means being contained in said casing, said gear reducing means to have a low profiled configuration, said forward wall of said transmission casing having a lower portion extending below said casing, said lower porton of said forward wall having a plurality of apertures therein through which a respective one of said rods extend, said forward wall being slidably mounted on said rods, said rear wall of said transmission casing having an upper portion extending above said casing, said upper portion of said rear wall being fixably and detachably mounted to said second mounting members, said rear wall portion having apertures to receive said guide pin and having a plurality of ports to receive hydraulic fluid for selective activation and lubrication of said gear reducing means; said guide rods being tapered to assume mating fit in said bore of said forward wall of said casing; means for delivering hydraulic fluid to said ports in said transmission's rear wall ports.

9. A frame as claimed in claim 8 wherein said means for delivering hydraulic fluid comprise: at least one of said walls of said rear section having a plurality of ports extending through said wall to a manifold within said rear section, a plurality of tubular members, each of said tubular members having one end received in a respective one of said ports in said manifold and the other end of said tubular member received in a respective one of said ports in said rear wall of said casing, means for selectively delivering hydraulic fluid to said ports in said rear section wall.

10. A frame as claimed in claim 8 wherein said steering drive means comprises:
 (a) a first mounting arm fixably mounted to and extending forward of said forward wall of said casing;
 (b) a second mounting arm fixably mounted to and extending forwardly of said forward wall of said casing, said first and second mounting arms have respective horizontal holes aligned transversely to said casing;

(c) a hub extending through and rotatably mounted in said bores of said mounting members, said hub having a longitudinally extending splined bore;

(d) a bevel gear fixably mounted to said hub generally vertical and perpendicular to said output shaft;

(e) a mating pinion to said bevel gear fixably mounted to said output shaft in constant mesh with said bevel gear;

(f) a first steering drive shaft carrying external mating splines to said splines in said hub;

(g) a second steering drive shaft carring external mating splines to said splines in said hub, said steering drive shafts being slidable in respective sides of said hub bore and extending beyond said hub;

11. A frame for a crawler tractor, comprising: a front section adapted to contain a radiator, an engine, and a rear section adapted to support an operator's compartment and contains a steering drive mechanism forward of a low profile power shift transmission, said rear section including a forward wall, a top and bottom wall, opposing sidewalls, and spaced apart interior walls extending between said top and bottom wall; a plurality of first mounting members fixably mounted to said bottom wall in proximity to said forward wall in said housing between said interior walls; a plurality of guide rods, each of said guide rods fixably mounted to a respective one of said mounting members at one end; a plurality of second mounting members fixably mounted to said top wall in said housing rearwardly of said first mounting members between said interior walls, an end wall detachably and fixably mounted to said housing enclosing said housing; said transmission being supported slidably along said rods and fixably and detachably mounted to said rear mounting members; said forward and end walls, and interior walls forming a containment for hydraulic fluid; first means to deliver and retrieve fluid from said containment; means for delivering hydraulic fluid to said transmission.

12. A frame as claimed in claim 11, wherein said transmission comprises: a casing having a forward, rear and sidewalls, said rear wall containing a plurality of ports, an output shaft rotatably mounted in said forward and rear walls of said casing carrying a first and second gear fixably mounted to said output shaft within said casing, and a spiral pinion fixably mounted to the end of said output shaft extending forward of said forward wall communicating with said steering drive mechanism; a first gear shaft rotatably mounted in said forward and rear wall of said casing carrying a third gear fixably mounted to said first gear shaft in constant mesh with said first gear, a plurality of fourth gears rotatably mounted to said first gear shaft, first clutching means for selectively coupling one of said fourth gears to said first gear shaft; a second gear shaft rotatably mounted in said forward and rear wall of said casing carrying a fifth gear fixably mounted to said second gear shaft and in constant mesh with said second gear; a plurality of sixth gears rotatably mounted to said second gear shaft; second clutching means for selectively coupling one of sixth gears to said second gear shaft; said output shaft, first gear shaft, and second gear shaft extending generally horizontally parallel and coplanar, an input shaft rotatably mounted in said forward and rear walls of said casing carrying a seventh and eighth gear rotatably mounted on said input shaft, means for selectively clutching said seventh and eighth gears to said input shaft; a countershaft having a ninth gear rotatably mounted thereon in constant mesh with said eighth gear, said countershaft being fixably mounted in said casing, said output shaft having a plurality of tenth gears carried on a hub rotatably mounted on said output shaft, each of said tenth gears being in mesh with a respective one of said fourth and sixth gears; one of said tenth gears in constant mesh with said seventh gear and another one of said tenth gears is in constant mesh with said ninth gear; means for communicating said ports with said clutching means and various other points in said transmission.

13. A frame as claimed in claim 12 wherein said means for delivering hydraulic fluid to said transmission comprises: at least one of said walls of said rear section having a plurality of ports extending through sidewall to a manifold within said rear section, a plurality of tubular members, each of said tubular members having one end received in a respective one of said port in said manifold and the other end of said tubular member received in a respective one of said ports in said rear wall of said casing, means for selectively delivering hydraulic fluid to said ports in said rear section wall.

14. A frame as claimed in claim 3 wherein said casing further includes at least one opening therethrough to allow hydraulic fluid to pass from the interior of said casing to housing.

15. A frame as claimed in claim 14 wherein said steering drive mechanism comprises:

(a) a first mounting arm fixably mounted to and extending forward of said forward wall of said casing;

(b) a second mounting arm fixably mounted to and extending forwardly of said forward wall of said casing, said first and second mounting arms have respective horizontal holes aligned transversely to said casing;

(c) a hub extending through and rotatably mounted in said bores of said mounting members, said hub having a longitudinally extending splined bore;

(d) a bevel gear fixably mounted to said hub generally vertical and perpendicular to said output shaft;

(e) a mating pinion to said bevel gear fixably mounted to said output shaft in constant mesh with said bevel gear;

(f) a plurality of steering drive shafts carrying external mating splines to said splines in said hub, said steering drive shafts being slidably in said hub bore and extending beyond said hubs to either side of said hub;

(g) means for driving and selectively steering said tractor including a first clutching means for selectively communicating one of said steering drive shafts to a first drive mechanism and a second clutching means for selectively communicating the other of said steering drive shafts to a second drive mechanism.

16. A frame as claimed in claim 15 wherein said means for driving and steering said tractor further includes said first clutching means being a brake-steering clutch receiving one end of one said steering shaft, said brake steering clutch being located between said one of said sidewalls and interior walls; said second steering clutch means being a brake-steering clutch receiving one end of the other of said steering shaft, said brake steering clutch being located between the other one of said sidewalls and interior wall; said steering shafts extending through respective openings in said interior walls; one of said side housings fixably mounted externally to each of said sidewalls of said frame housing, each of said side housings containing a plurality of communicating gears, one of said gears being fixably mounted on a shaft extending through said side housing and received by a respective brake-clutch and rotatably mounted in said side housing, each of said side housings having a fixably and detachably mounted quill located such that when said quill is removed, said shaft and gear communicating with said respective brake-clutch can be slidably removed; each of said side housings further having a driven shaft rotatably mounted therein and extending therefrom in driven communication with said housing gears.

* * * * *